United States Patent
Lindgren et al.

(10) Patent No.: US 6,732,922 B2
(45) Date of Patent: May 11, 2004

(54) SYSTEM ENABLEMENT OF AUTOMATIC FARE COLLECTION DEVICES USING A NETWORK

(76) Inventors: Robert Lindgren, 10348 La Duena Way, San Diego, CA (US) 92124; Pradip Mistry, 11660 Ramsdell Ct., San Diego, CA (US) 92131; Brian T. Monk, 7555 La Jolla Blvd., La Jolla, CA (US) 92037; Carl Noblitt, 29704 Via Naravilla Ct., Sun City, CA (US) 92586

( * ) Notice: Subject to any disclaimer, the term of this patent is extended or adjusted under 35 U.S.C. 154(b) by 0 days.

(21) Appl. No.: 10/147,233

(22) Filed: May 14, 2002

(65) Prior Publication Data

US 2003/0019927 A1 Jan. 30, 2003

Related U.S. Application Data

(60) Provisional application No. 60/291,064, filed on May 14, 2001.

(51) Int. Cl.[7] .................................................. G06F 7/08
(52) U.S. Cl. ........................................................ 235/381
(58) Field of Search .............................. 235/381, 375, 235/380, 382, 384, 492; 705/5, 13, 41, 44, 65; 713/182, 201

(56) References Cited

U.S. PATENT DOCUMENTS

| | | | |
|---|---|---|---|
| 5,043,561 A | | 8/1991 | Kimata |
| 5,819,234 A | | 10/1998 | Slavin et al. |
| 6,003,014 A | | 12/1999 | Lee et al. |
| 6,018,717 A | | 1/2000 | Lee et al. |
| 6,032,857 A | | 3/2000 | Kitagawa et al. |
| 6,070,146 A | | 5/2000 | Mimata |
| 6,085,976 A | * | 7/2000 | Sehr ........................... 235/384 |

(List continued on next page.)

FOREIGN PATENT DOCUMENTS

| | | |
|---|---|---|
| EP | 0163507 A2 | 12/1985 |
| EP | 0465456 A1 | 1/1992 |
| JP | 4306788 | 10/1992 |
| WO | WO 93/09516 | 5/1993 |

OTHER PUBLICATIONS

"*Bizipoint.com—Global eMarketplace in the Electronics Industry*", <http://www cn.bizipoint.com/en/NewPartner-.php3>.

"*Gemplus—1998 Press Releases*", <http://www.gemplus-.com/about/pressroom/press/index98.htm>.

"*San Diego Metropolitan—S.D. Scene—Apr. 1999*", <http://www.sandiegometro.com/1999/apr/sdscene.html>.

*ZDNet: Interactive Week: OnGuard: Put It on the Card*, <http//www.zdnet.com/intweek/stories/news/0,4164, 2570926,00.html>.

"*Welcome to E–Z Pass*", <http //www.ezpass.com/...>.

Primary Examiner—Thien M. Le
Assistant Examiner—Edwyn Labaze (57) ABSTRACT

A system for Internet Enablement of automatic fare collection devices, such as smart cards, interfaces to smart card fare systems to increase the ability to sell and process transit payments and to collect entry permits or tickets at an access device or fare collection equipment. The system comprises a server containing a database for storing accounts of individual cardholders where each smart card is associated with a unique account. A patron or cardholder accesses his account via a terminal containing a web browser to purchase entry permits. Once the entry permits have been purchased, the cardholder presents his card to an access device which communicates with the server to determine if there are any pending entry permits. If there are any pending entry permits associated with the access device, the entry permit is written to the smart card and the other entry permits remain pending until the cardholder presents the card at the appropriate access device.

20 Claims, 3 Drawing Sheets

U.S. PATENT DOCUMENTS

| | | |
|---|---|---|
| 6,118,860 A | 9/2000 | Hillson et al. |
| 6,119,096 A * | 9/2000 | Mann et al. ............... 705/5 |
| 6,125,988 A | 10/2000 | Waters |
| 6,216,227 B1 | 4/2001 | Goldstein et al. |
| 6,223,166 B1 | 4/2001 | Kay |
| 6,259,769 B1 * | 7/2001 | Page et al. ............... 235/375 |
| 6,282,522 B1 | 8/2001 | Davis et al. |
| 6,474,544 B2 | 11/2002 | Di Giorgio et al. |
| 6,577,229 B1 * | 6/2003 | Bonneau et al. ......... 340/10.41 |
| 6,595,416 B1 * | 7/2003 | Newsome et al. .......... 235/381 |
| 6,609,655 B1 * | 8/2003 | Harrell ..................... 235/380 |
| 6,655,587 B2 * | 12/2003 | Andrews et al. ............ 235/383 |
| 2002/0002534 A1 * | 1/2002 | Davis et al. .................. 705/39 |
| 2002/0188863 A1 * | 12/2002 | Friedman ..................... 713/201 |

* cited by examiner

SYSTEM ENABLEMENT OF AUTOMATIC FARE COLLECTION DEVICES USING A NETWORK

CROSS-REFERENCES TO RELATED APPLICATIONS

This application claims the benefit of priority of U.S. provisional application Serial No. 60/291,064 filed May 14, 2001 which is incorporated herein by reference in its entirety.

BACKGROUND OF THE INVENTION

The present invention relates generally to automatic fare collection and ticketing devices and systems and specifically to smart card systems for purchasing tickets or passes to be stored on a smart card.

Smart cards are being used in an increasingly wide variety of applications. One such application is the use of smart cards to provide payment and ticketing capability for mass transit users. Smart cards have found applications in many other areas including pay phones, health care, banking, identity and access, pay television, gaming, metering and vending. Retail businesses utilize smart cards to encourage return business, such as the use of smart cards to obtain a discount on merchandise or to gain points that are redeemable for cash or merchandise.

Smart cards generally include one or more smart chips or integrated circuits ("IC") located within the body of the card to receive and store information or applications. The ICs can be read-only or have read/write capability. Reusable smart cards with read/write capability allow users to add time or value to payment-type smart cards, thus avoiding the inconvenience of having to carry currency, or, in the case of mass transit, exact change, for each usage. The smart card will also contain interface means, which will depend on whether the smart card is a contact-type or contactless smart card. Contactless cards will contain an antenna structure for communication with an RF source, and typically include circuitry adapted for deriving operating power from the RF signal.

The smart card is a small, usually credit card shaped, device that contains at least a memory device, typically an embedded integrated circuit, for storing information and applications and a transceiver to communicate with a smart card communication device. The smart card communication device communicates through the transceiver on the smart card to access the stored information. The smart card communication device may simply read the information, load the information into the memory device or modify existing data in the memory device. For example, if the owner of a smart card uses a smart card containing financial information to make a purchase, the smart card communication device can read the information including the cardholder's identity and the availability of funds. The smart card communication device can also deduct the purchase amount from available funds if it has writing capabilities. Further, the communication device can store transaction data on the smart card including the time and location of the transaction in addition to the identity of the communication device.

Traditionally, when patrons or cardholders purchase tickets for using their smart card, the smart card systems have utilized serial communications and proprietary protocols to deliver content and collect data from fare collection equipment located at stations and depots. In addition, the communications to a Central System are via an intermediate communications controller. When a cardholder wishes to add time or value to payment-type smart cards, all the data is immediately written on to the card via a writing device. As a result, the cardholder must have access to a writing device, such as a card reader, at the time of purchase. Furthermore, these types of systems tie up network traffic and require large storage requirements at access devices in the field.

SUMMARY OF THE INVENTION

It is an object of the present invention to deliver transport ticketing of any kind, fare payment and loyalty award solutions via the Internet.

It is another object of the present invention to provide an Internet based interface to smart card ticket systems to increase the ability to sell and process transit payments, to support a shift to a more cash-less environment, to purchase or authorize tickets over the Internet, to collect the tickets at the access device or fare collection equipment, and to support ticketing, or other applications, that are non-transit related.

It is yet another object of the present invention to provide applications for use with the Internet based interface for contact or contactless smart card (CSC) purchase and registration, CSC personalization, CSC transit application tracking, and CSC non-transit application purchase and loading.

In the present invention, an automatic Travel, Transport or Event system utilizes a server containing a database or databases to store information related to accounts of individual patrons or cardholders. The database(s) can be accessed by the cardholder by using a terminal containing a browser, such as a personal computer or personal digital assistant. Once accessed, the patron can purchase entry permits, such as travel tickets, fares and passes. The purchase is not automatically downloaded onto the card at the time of purchase, so the patron is not required to have access to a card reader when purchasing the entry permits.

When the patron or cardholder presents the card at an access device, such as a check in device, gate, kiosk or validator, the entry permit associated with that access device is downloaded and written to the card. The other entry permits that were purchased remain as pending transactions on the server or in other pertinent devices. As an example, if a patron purchases a subway ticket, a travel ticket, a ticket to a baseball game and an event ticket, when the patron presents his or her card at an access device at a subway station, the subway ticket is written to the card, but the other tickets remain pending on the server or in other appropriate devices. When the patron later presents his or her card at an access device at the baseball game, or Airport/Seaport, the appropriate pre purchased ticket is written to the card.

The foregoing, together with other features and advantages of the present invention, will become more apparent when referring to the following specification, claims and accompanying drawings.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 5 is an illustration of a home personal computer and agency personal computer of the present invention.

DETAILED DESCRIPTION OF THE DRAWINGS

Figure 1:
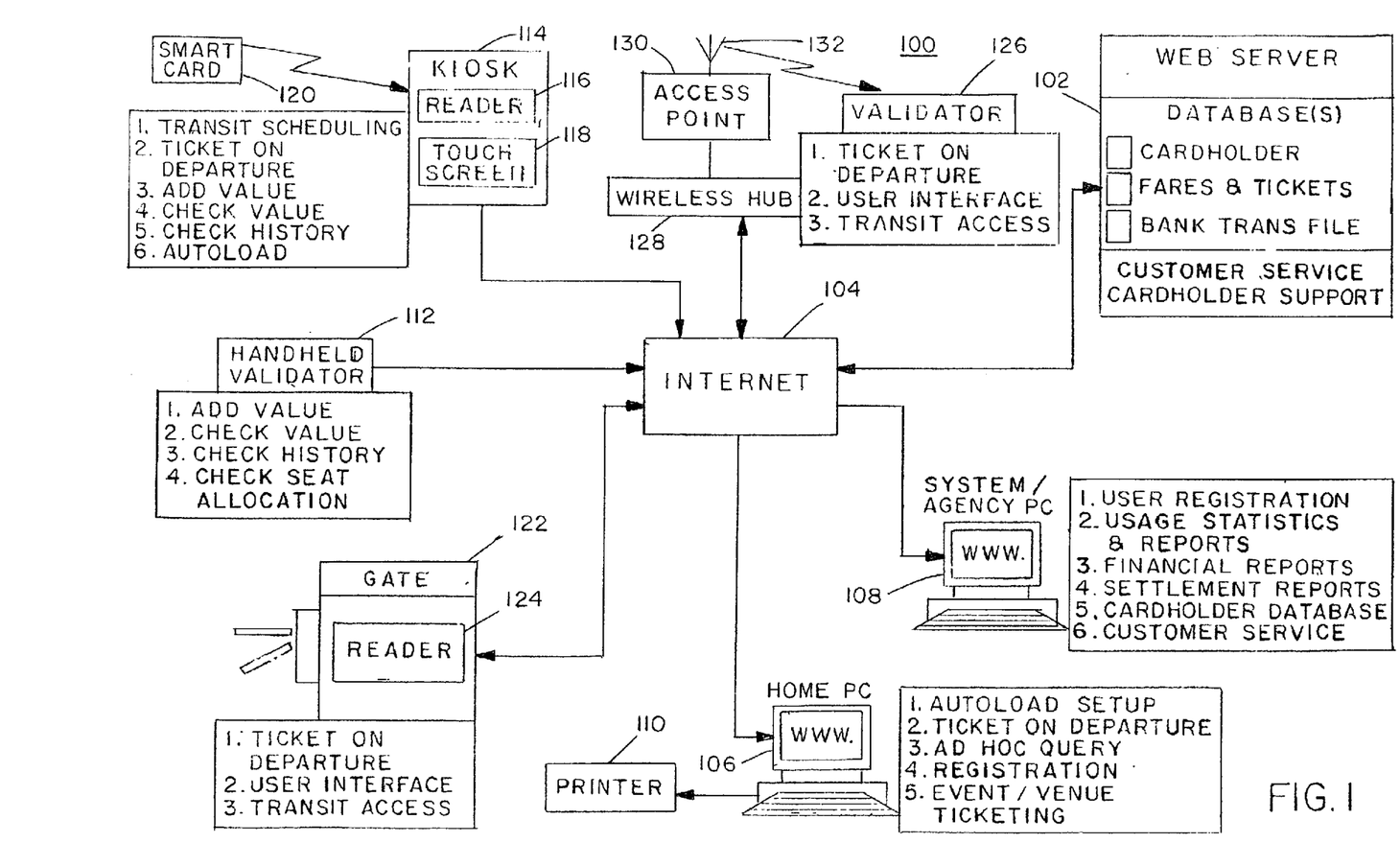
FIG. 1 is a diagram of an Internet Enablement System Network of a Preferred Embodiment.

FIG. 1 illustrates an automatic fare collection system, such as a smart card communication system 100 in accordance with the preferred embodiment. The smart card communication system 100 is implemented as part of a mass transport or transit fare collection system in the preferred embodiment. Those skilled in the art will recognize that the principles and teachings described herein may be applied to a variety of applications or industries.

The smart card communication system 100 of the present invention includes a web server 102 that contains at least one database for storing information associated with a smart card, or any other device containing a smart chip or capable of storing information or applications. Information about the cardholder and the system or agency that issues the card, such as a transit authority, is stored within the database(s). Once a smart card has been issued to a patron or cardholder and the card has been activated, an account is generated and stored in the database(s) and the account is linked to the card by a unique serial number assigned to the card. To obtain a card, a patron can either purchase a card via a network, such as the Internet, directly call the agency and purchase a card over the phone or purchase a card at various agency locations, such as a transit station. If purchasing on the Internet or calling the agency, an unactivated smart card will be sent to the purchaser in the mail along with a PIN number.

Once the patron or cardholder has received the smart card, the patron or cardholder must activate or register the card with the agency and set up an account. The cardholder can register the card via the network 104 by accessing the agency's website on the Internet by using a terminal 106, such as a personal computer, personal digital assistant or any other device containing a browser, or by telephoning the agency's customer service cardholder support to register the card over the phone with the assistance of agency personnel. Specifically, the cardholder must link the serial number of the card with the cardholder's personal information.

If activating the card on the agency's website, the cardholder will be prompted to enter the serial number of the card and a personal PIN number that is associated with the card. The PIN is normally sent to the patron under separate cover from the card and is used to validate the cardholder to allow him to access his account. Once validated, the cardholder will be prompted to enter his or her first and last name, the company, if any, that purchased the card for an employee, his or her address, including the city, state, zip code and country, telephone number and e-mail address. The cardholder can also choose to enter payment information relating to future purchases, such as a credit card number so that any purchases will automatically be billed to a specific credit card. This allows the cardholder to make purchases without having to have a credit card or exact change. The above account information is by way of example only and each agency can request more or less information about the cardholder.

As discussed previously, upon activation of the card, all the information will be stored within the database(s) and the smart card is linked to the cardholder's account by the serial number assigned to the card. Accessing the account allows the cardholder to view entry permits, such as the tickets, passes and value or money stored in the transaction purse (T-purse) in the account that are available on the card for use, as well as purchase additional entry permits. To make additional purchases, the card holder accesses his account by using a browser to communicate with the server storing his account information. After a purchase, the cardholder is sent a confirmation either by email or regular mail if the cardholder does not have an email account. When the cardholder presents his card at an access device, such as a kiosk 114, a gate 122 or a validator 126, there is an instantaneous querying to the server 102 for pending entry permits that have been purchased on-line and that are to be written onto the card. As an alternative, the access device may be pre-loaded with the entry permit.

In addition to the cardholder's account, the database(s) includes a fares and tickets file, which contains a listing of all entry permits available for purchase including the various tickets, fares and events and any special discounts for particular groups such as seniors. New tickets, fares and events can be easily added to the list of available entry permits in the fares and tickets file so that cardholders may purchase tickets to these events over the network 104 and have the entry permit linked with their account. The file also maintains a description of the tickets, fares and events, the various prices of the tickets of the event and the period for which a cardholder can purchase a ticket for a particular event. Once an event is completed, the event is removed from the file and cardholders can no longer purchase tickets to that particular event.

Also included in the database(s) is a bank transaction file. The bank transaction file contains the different payment options available to a cardholder. These options include, but are not limited to, charging purchases to a credit card on file, using a debit card, sending a statement to the cardholder or allowing the cardholder to enter a new credit card number. If a cardholder has a credit card on file for automatic payment, the smart card is linked to the cardholder's account containing the credit card information, including the type of card, card number and expiration date. Any entry permit purchases, including fares, passes, event tickets and adding money to a card can be directly applied to the credit card linked to the account.

Kiosks are located at convenient patron locations, such as the entrances to a transit system subway, and allow a cardholder to load entry permits or value for entry to the transit system. Each kiosk contains a touch screen 118 and a card reader 116. The cardholder can present the card at a kiosk 114 which contains a card reader 116 and a touch screen 118. When a cardholder approaches a kiosk, the cardholder uses the touch screen 118 to proceed. The cardholder is first requested to present the card 120 to the card reader 116 to determine the data stored on the card. The card reader reads the serial number from the card 120 and communicates with the database on the server 102 to access the cardholder's account which indicates if the cardholder has any pending purchases and indicates how many entry permits are available on the card.

Gates can also be located at entrances to the transit system, such as a subway, and allow a cardholder entry to the transit system. Each gate contains a card reader 124 and to gain entry to the transit system, the cardholder must present the card to the reader. The gate 122 is in communication with the server 102 via the network 104, reads the serial number from the card and sends the number to the server where the cardholder's account is accessed in the database. As an alternative the gate may be pre-loaded with the entry permit. The card is loaded with the proper entry permit and the cardholder is granted access to the transit system, thus providing the card reader with a ticket on departure. A ticket on departure is when an entry permit is purchased on-line and the entry permit is written or transferred to the card when the card is presented at the gated, granting the cardholder access to the transit system.

If a kiosk 114 or a gate 122 is not available, the cardholder can present the card to a validator 126. Typically, validators are located on platforms that do not have a gate or at an entrance to a travel service or venue and are also located on a moving vehicle such as a bus. The validator 126 is in communication with the server 102 via the network 104. To establish a connection with the server, a wireless hub 128 and an access point 130 are utilized. The access point 130 reads the serial number off of the card and transmits the number to the wireless hub 128 using an antenna 132 on the access point 130. The access point 130 establishes the connection between the wireless hub 128 and the network 104. Once this connection is established, the serial number of the card is sent to the server where the cardholder's account is accessed in the database. As an alternative, the validator may be pre-loaded with the entry permit. The validator also uses the antenna to download or write transactions to the card on the moving vehicle. A typical validator will contain a smart card display and a printer to print out a receipt.

Entry permits are not written to cards prior to presenting the card at an access device. This cuts down on network traffic and storage requirements at devices in the field. When the tickets are written onto the card, only the tickets relating to the event or venue where the card is being presented are written. Thus, if a cardholder purchases a bus ticket and tickets to a baseball game, when the cardholder presents the card at an access device at the bus station, the bus ticket is automatically written onto the card, but not the baseball tickets. The card must be presented at an access device at the baseball game to write the baseball tickets to the smart card.

The patron or cardholder can select from numerous options when accessing his or her account via the Internet. Options include changing account details, such as address or payment options, activating a card, purchasing fares or tickets, adding money or ad hoc querying (i.e. viewing the cardholder's account details). An account history describes the entry permits stored on the card, such as tickets and passes for any transportation modes, and how much money or what event tickets are written onto the card. He or she can also decide to purchase additional entry permits, such as fares, tickets, add money or purchase tickets to events which will later be written on the card when the card is presented at the access devices. As discussed previously, payment for the purchase can be made by charging the purchase to a credit card or bank account located in the system linked with their account or the cardholder can choose to charge the purchase to another credit card by typing in the credit card number and expiration date. Once the cardholder has completed the transaction, the cardholder can print out a receipt of the transaction on a printer 110 attached to a terminal 106, such as the cardholder's personal computer.

If the cardholder selects the autoload setup or purchase option, the cardholder must select between the possible ticketing options. If the ticket option is selected, the cardholder is given several additional options to select from. It allows the cardholder to purchase specific quantities of transit tickets for various methods of transportation, such as air, rail, bus or add a specific amount of money to the transit purse (T-purse) allowing for trips that are based upon money. In addition to the trips, the cardholder can also purchase passes that are good for a specified day and time, amount of days or add money to the account. With the autoload option, a screen appears listing entry permits that the cardholder can purchase. The listing of the various trips, passes and money that can be added to the card appears in one column with a box next to each item. The cardholder just types in the quantity of tickets, passes or money to be added to the account in the box and submits the purchase to the server 102.

In the preferred embodiment, the cardholder is allowed the option of where to collect the purchase. A drop down box containing all the available locations appears on the screen and the cardholder must choose one of the options. Additionally, the cardholder may also indicate that a separate entity, such as the cardholder's employer is paying for the tickets by selecting this feature if available. Some companies pay for a portion or all of an employee's transit tickets as a way to encourage employees to take mass transit and reduce pollution by not driving to work. Selecting this feature will cause the purchase to be billed to the employer instead of the employee. The system can be set up so that an employee can only bill certain entry permits and a certain amount of money will be used in the course of the cardholder's employment.

If the ad hoc query option has been selected, the cardholder has chosen to view the details of his account. A listing appears detailing all the available entry permits as well as a detailed listing of the history of the account indicating how the card has been used. If the registration function has been selected, the cardholder can register the unactivated card as described previously. If the event/venue ticketing function has been selected, the cardholder can purchase entry permits to certain events such as concerts or sporting events. The cardholder merely has to enter the day of the event and the number of tickets the are to be purchased. The system checks the database to determine if there are any tickets left for purchase on that particular day. If so, the system informs the cardholder that there are enough available tickets and asks if the cardholder would like to charge the purchase to the credit card that is on file or to another credit card. Once the tickets have been purchased, a confirmation is sent to the cardholder via the network. The cardholder can then print out the confirmation as a receipt. If the tickets were purchased at a kiosk, the cardholder has the option of receiving a receipt printed directly from the kiosk. When the cardholder shows up at the event and presents the card to a card reader, the tickets are downloaded or written onto the card and the cardholder is allowed entrance to the event. Depending on how the system is set up, once the card is presented, a paper ticket can be printed out indicating the location of the seats and/or the location can appear on a screen so the cardholder knows where to sit. The seat number can also be encoded on the card for subsequent inspection.

Once in the event, the seats can be confirmed using a hand held validator 112. If there is a dispute as to who is allowed to sit in a particular seat, the card can be read indicating the exact seat number. The handheld validator 112 communicates with the server through the network 104. In addition, the handheld validator 112 can add and check value on the card 120, check the account history of the patron or cardholder and check the seat allocation for the event. This is equally applicable to transport systems where a seat is allocated to a journey.

Alternatively, if the cardholder does not have network access, the agency can update the cardholder's card and add tickets to events, add fares, add money or any other item allowed within the system. The cardholder calls the customer service of the agency and the agency communicates with the server containing the database(s) with the patron or the cardholder's account using a host terminal 108 such as a personal computer or any other device containing a browser. The agency can perform multiple functions for the cardholder. First, the agency can set up an account for a new cardholder and register the cardholder. Usage statistics and reports are available to the agency which allows the agency to view the status of the cardholder's account, including the financial and settlement reports which indicate what was billed to the cardholder and what the cardholder has written to his or her card. It also allows service personnel to remotely access devices, such as kiosks, gates and validators, through the internet to gather usage statistics and support maintenance functions. Based upon the usage statistics of each entry device, maintenance personnel know which entry devices need maintenance and when.

Once a cardholder has purchased entry permits, such as fares, tickets or added money onto a card, the card must be presented at an access device to write the purchase onto the card. A card reader is not required for the purchase of entry permits. As discussed previously, once the card is presented, there is an instantaneous querying to the server or the device's database where the account is linked to the serial number of the card. If a purchase is pending, the server 102 writes the information to the card. Only entry permits associated with a particular location are written at a time.

As described previously, an account history for a smart card used to access various transport systems and events is stored on the server 102. Table 1 below illustrates an account history for a smart card utilized between Feb. 16, 2001 and Apr. 2, 2001. The account history indicates the date of the transaction, where the transaction took place, the machine or how the transaction took place, the event involved, the type of transaction, whether an item was debited or credited to the account and the money value associated with the account. As is illustrated in Table 1, a cardholder initially credits the transit purse of his account with $20 at the Wall Street Station on the subway. Then the cardholder enters subway at the Wall Street Station by presenting the card at an access device. The access device sends a message to the server that the cardholder has entered the subway at the Wall Street Station. Upon getting to his destination at the Central Station stop on the subway, the cardholder once again presents his card at an access device as he exits the subway. The access device sends a signal to the server indicating that the cardholder has exited the system. Upon the server recognizing that an entry and exit has occurred, the system deducts the appropriate fare for the trip from $20 purse stored on the card.

On Feb. 20, 2001, the cardholder again uses the subway, entering at Central Station and exiting at Union Square. The fare for this trip is then deducted from the remaining monetary value on the transit purse. Next, the cardholder, using a personal computer, purchases 10 subway trips at a value of $15. At this point, the 10 subway trips are still pending on the server and have not been written to the account. After purchasing the subway trips, the cardholder takes a bus trip. Upon entering the bus, the cardholder presents the card at an access device on the bus, such as a validator, and the bus fare is deducted from the remaining monetary value stored in the transit purse.

Three days later, the cardholder, once again uses the subway entering at Wall Street Station and exiting at Central Station. Upon entering the Wall Street Station and presenting the card to an access device, the access device reads the serial number from the card and queries the server for any pending entry permits for the subway. The 10 subway trips that the cardholder purchased three days earlier are downloaded unto his card. Upon exiting at Central Station and presenting the card to an access device, the access device reads the serial number from the card and informs the server to deduct 1 subway trip from the card. On Apr. 2, 2001, the cardholder adds 1 subway trip, $5, 1 bus trip and 1 ticket to the Lakers game. This purchase is stored at the server or applicable devices until written to the card when the cardholder presents the card at the appropriate access device.

TABLE 1

Account History of a Smart Card

| Date | Location | Machine | Event | Type | DB/CR | Amount |
|---|---|---|---|---|---|---|
| Apr. 2, 2001 | Home PC | INET | Knicks v. Lakers Mar. 21, 2001 | Lower seat | Add | $265.00 |
| Apr. 2, 2001 | Home PC | INET | Bus | Bus 1 trip | Add | $3.00 |
| Apr. 2, 2001 | Home PC | INET | T-Purse | $5 value | Add | $5.00 |
| Apr. 2, 2001 | Home PC | INET | Subway | sub 1 trip | Add | $1.50 |
| Mar. 26, 2001 | Home PC | INET | Rail | Rail 1 trip | Add | $2.50 |
| Mar. 26, 2001 | Central Station | M24 | Subway | sub 1 trip | Deduct | sub 1 trip |
| Mar. 26, 2001 | Wall Street Station | M23 | Subway | sub 10 trips | Add | sub 10 trips |
| Mar. 23, 2001 | Home PC | M23 | Bus | Entry | Deduct | $1.50 |
| Mar. 23, 2001 | Home PC | INET | Subway | sub 10 trips | Add | $15.00 |
| Feb. 20, 2001 | Union Sq. | M40 | Subway | Exit | Deduct | $1.50 |
| Feb. 20, 2001 | Central Station | M23 | Subway | Entry | | |
| Feb. 16, 2001 | Central Station | M24 | Subway | Exit | Deduct | $1.50 |
| Feb. 16, 2001 | Wall Street Station | M23 | Subway | Entry | | |
| Feb. 16, 2001 | Wall Street Station | A01 | T-Purse | $20 value | Add | $20.00 |

Figure 2:
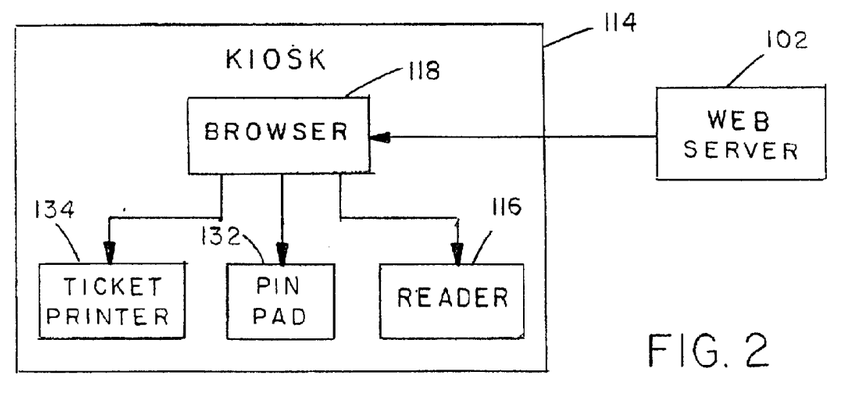
FIG. 2 is an illustration of a kiosk architecture of the present invention.

FIG. 2 illustrates a block diagram of the kiosk. The kiosk is in communication with the server 102 to access information regarding smart cards. Typically, a kiosk is comprised of a screen containing a browser 118, a card reader 116, a pin pad 132 and a ticket printer 134. Kiosks are generally located at entrances to transport systems and can also allow cardholders access to the transport system. To purchase an entry permit from a kiosk, the cardholder must present his card and enter his PIN number via the pin pad 132. In the preferred embodiment the browser is customized to run a particular application, such as the agency web page for purchasing entry permits, but could be extended to use other applications, such as pick up email or go to third party agencies. The system could also be set up to allow a patron to surf the Internet while waiting for his or her ride. A fee could be charged for this access and deducted from the smart card. The kiosk can also provide information about the cardholder's route, location and event ticketing.

Figure 3:
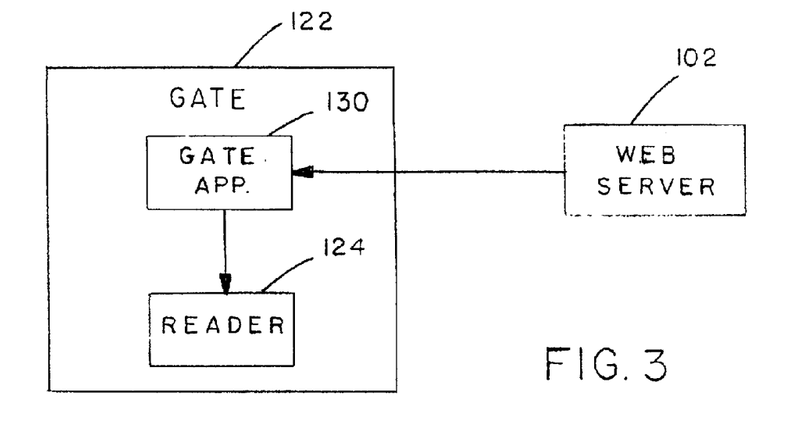
FIG. 3 is an illustration of a gate architecture of the present invention.
Figure 4:
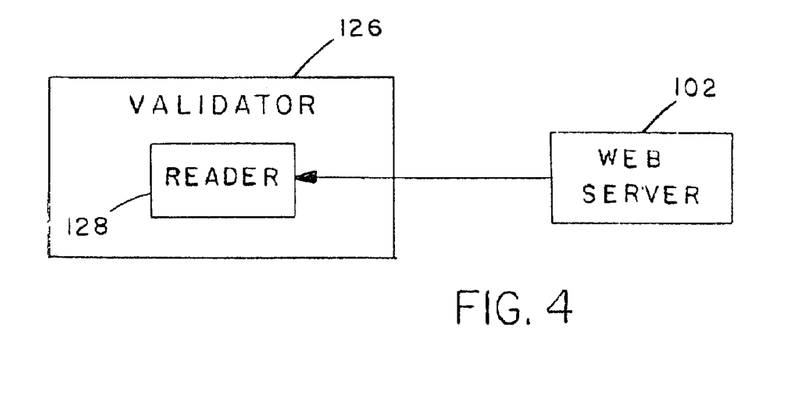
FIG. 4 is an illustration of a validator architecture of the present invention.
Figure 5:
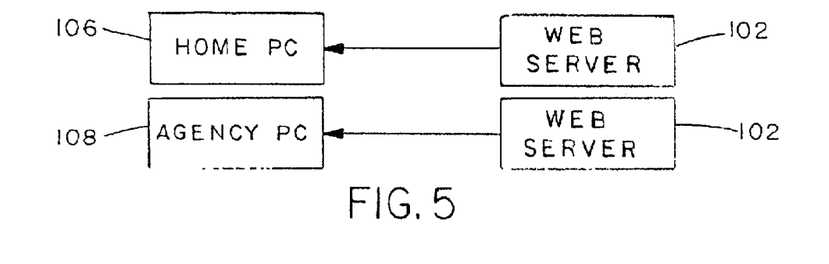

FIG. 3 illustrates a block diagram of the gate 122. The gate 122 communicates with the server 102 via the network. The gate is comprised of a card reader 124 and a gate applicator 130 for dispensing hard copies of entry permits, such as tickets FIG. 4 is a block diagram of the validator. The server 102 is in communication with the validator 126 via the network and the reader 128. FIG. 5 is a block diagram of the terminal 106 and the home terminal 108 connected directly to the server 102 instead of through the network or Internet 104.

Figure 6:
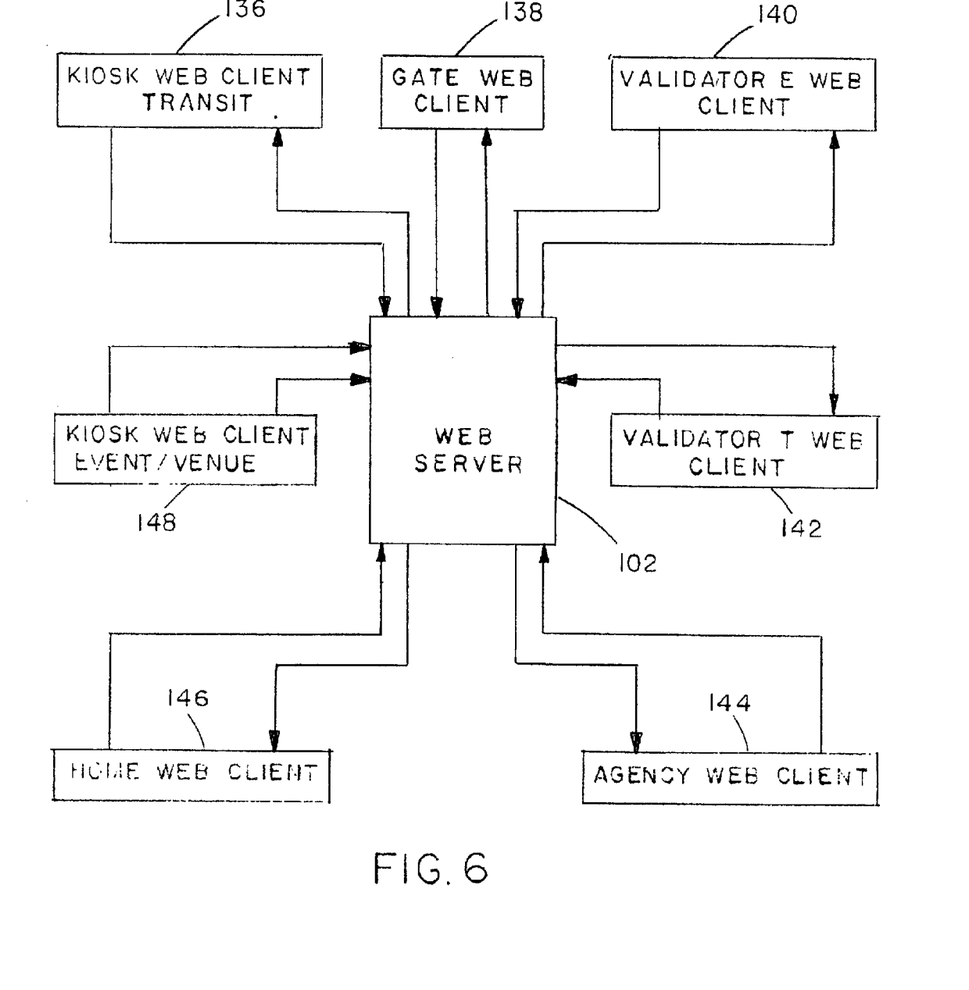
FIG. 6 is block diagram illustrating the interaction of all the devices illustrated in FIG. 1.

FIG. 6 is a block diagram showing the interaction of all the devices illustrated in FIG. 1. Specifically, it illustrates the traffic among all the access devices and terminals. The kiosk 136, send transactions to the server and receives ticket on departures from the server 102. As discussed previously, a ticket on departure is when a cardholder purchases a ticket on-line and downloads the ticket to the card upon presenting the card to the associated access device. The Gate Web Client, or gate, 138 and the Validator T Web Client 142, or validator (for fare purchases), send transactions to the server and receive ticket on departures from the server 102. The Validator E Web Client 140, or validator (for event ticket purchases) and the Kiosk Web Client (Event/Venue) send transactions to the server and receive event tickets on departures from the server 102. Finally, the Home Web Client 146, or terminal, and the Agency Web Client 144, or host terminal, communicate with the server 102 by sending account information and purchasing tickets, the server sends back confirmation only, tickets are not downloaded onto the card.

Although an exemplary embodiment of the invention has been described above by way of example only, it will be understood by those skilled in the field that modifications may be made to the disclosed embodiment without departing from the scope of the invention, which is defined by the appended claims.

We claim:

1. A system for enablement of automatic fare collection devices using a network, the system comprising:
    a server containing at least one database with a plurality of patron accounts, whereby each patron account is associated with a corresponding individual patron and an individual automatic fare collection device;
    a terminal in communication with said server, whereby said terminal contains a web browser for enabling communication with said server via said network and whereby said patron accesses said patron account via said network to purchase at least one entry permit; and
    a first access device of a plurality of access devices in communication with said server and associated with said at least one entry permit; and
    whereby said patron presents said automatic fare collection device to said first access device and whereby said access device queries said server to locate the purchase of said at least one entry permit and whereby said automatic fare collection device is updated with said at least one entry permit if said at least one entry permit is associated with said first access device and whereby if said at least one entry permit is presented to a second access device, said at least one entry permit is not written to said automatic fare collection device.

2. The system of claim 1, wherein said automatic fare collection device is a smart card.

3. The system of claim 2, wherein said first access device is selected from the group comprising a gate, a kiosk and a validator.

4. The system of claim 3, wherein said gate comprises a card reader that reads the serial number of said card to locate the purchase of said at least one entry permit for the corresponding cardholder account.

5. The system of claim 3, wherein said kiosk comprises a card reader that reads the serial number of said card to locate the purchase of said at least one entry permit for the corresponding patron account and a touch screen for allowing said cardholder to select from a plurality of options.

6. The system of claim 5, wherein said plurality of options includes selecting a payment option, selecting an account history option and selecting purchase additional entry permits option.

7. The system of claim 3, wherein said terminal is a personal computer.

8. The system of claim 3, wherein said terminal is a personal digital assistant.

9. The system of claim 3, wherein said at least one entry permit is validated using a handheld validator to ensure said patron has gained the appropriate access.

10. The system of claim 3, wherein a printer is linked to said terminal for printing a receipt as confirmation of said purchase of said at least one entry permit.

11. The system of claim 3, wherein said patron must enter said serial number of said card and a PIN number to gain access to said account.

12. The system of claim 2, wherein said network is the Internet.

13. The system of claim 2, wherein said first access device comprises a subgroup of a plurality of access devices.

14. The system of claim 13, wherein said subgroup comprises all gates at a stadium.

15. The system of claim 13, wherein said subgroup comprises all entrances at a subway station.

16. The system of claim 13, wherein said subgroup comprises bus gates for a transit authority.

17. The system of claim 1, wherein a second at least one entry permit associated with a second access device is purchased by said patron and wherein said automatic fare collection device is updated with said second at least one entry permit if said second at least one entry permit is presented at said second access device.

18. A method of network enablement of automatic fare collection devices, the method comprising:
    activating an automatic fare collection device via a network and setting up an account associated with a unique, corresponding individual patron and whereby said account is stored in at least one database on a server;

purchasing at least one entry permit via said network to be stored in said patron's account on said server;

presenting said automatic fare collection device to a first access device containing a card reader whereby said automatic fare collection device reader reads a serial number for said automatic fare collection device and queries said server for said at least one entry permit;

transferring said at least one entry permit onto said automatic fare collection device if said at least one entry permit is associated with said first access device and whereby if said at least one entry permit is presented to a second access device, said at least one entry permit is not written to said automatic fare collection device.

19. The method of claim 18, wherein said automatic fare collection device is a smart card.

20. The method of claim 19, wherein said first access device is selected from the group comprising a gate, a kiosk and a validator.

* * * * *